United States Patent
Chen (10) Patent No.: US 11,764,498 B2
(45) Date of Patent: Sep. 19, 2023

(54) CONDUCTIVE CLAMPING COMPONENT WITHIN TERMINAL BLOCK

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 0 days.

(21) Appl. No.: 17/579,564

(22) Filed: Jan. 19, 2022

(65) Prior Publication Data

US 2023/0170632 A1      Jun. 1, 2023

(30) Foreign Application Priority Data

Nov. 26, 2021   (CN) .......................... 202111421427.5

(51) Int. Cl.
  *H01R 4/48* (2006.01)
  *H01R 9/24* (2006.01)
(52) U.S. Cl.
  CPC ............. *H01R 9/2416* (2013.01); *H01R 4/48* (2013.01)

(58) Field of Classification Search
  CPC ...... H01R 9/2416; H01R 4/48; H01R 4/4809; H01R 4/4818; H01R 4/4845
  See application file for complete search history.

(56) References Cited

U.S. PATENT DOCUMENTS 5,116,238 A * 5/1992 Holloman ............ H01R 4/4818
                                                                 439/441
9,136,641 B2 * 9/2015 Bishop ................. H01R 12/718

* cited by examiner

*Primary Examiner* — Vanessa Girardi (57) ABSTRACT

A plug-in terminal block includes at least one conductive assembly including a conductive component connected with a housing assembly and a clamping component arranged on the conductive component. The conductive component includes a first support portion, a first clamping portion, a first connecting portion connected with the first clamping portion, and welding feet. The first connecting portion and the welding feet separately extend along different directions from the first support portion. The clamping component includes a second support portion and a second clamping portion. The second support portion is arranged on the first support portion. The second clamping portion is arranged above the second support portion. The first support portion, the first connecting portion, and the second clamping portion form a triangular structure. One end of the second clamping portion away from the second support portion is a free end that is movable up and down.

17 Claims, 8 Drawing Sheets

CONDUCTIVE CLAMPING COMPONENT WITHIN TERMINAL BLOCK

TECHNICAL FIELD

The present disclosure relates to a field of terminal block technology, and in particular to a plug-in terminal block.

BACKGROUND

Terminal blocks are electronic components configured to connect wires. However, conventional terminal blocks are generally large in size and are not suitable for devices with small spaces such as LED lighting drivers. In a device with a small space, screw terminals are commonly used to fix the wires, which is troublesome to operate.

In addition, in the prior art, internal conductors of a plug-in terminal block are easily deformed when the wires are frequently plugged in and unplugged, resulting in poor contact and other situations, which poses a certain safety hazard.

In view of this, the applicant provides the present disclosure after studying the prior art.

SUMMARY

The present disclosure provides a plug-in terminal block, which aims to solve above-mentioned technical problems.

In order to solve the above technical problems, the present disclosure provides a plug-in terminal block. The plug-in terminal block comprises at least one conductive assembly. The at least one conductive assembly comprises a conductive component and a clamping component. The conductive component is connected with a housing assembly. The clamping component is arranged on the conductive component.

The conductive component comprises a first support portion, a first clamping portion, a first connecting portion, and welding feet. The first connecting portion and the welding feet separately extend along different directions from the first support portion. The first clamping portion is connected with the first connecting portion.

The clamping component comprises a second support portion, a second clamping portion, and a third clamping portion. The third clamping portion extends outward from the second clamping portion. The second support portion is arranged on the first support portion. The second clamping portion is arranged above the second support portion. The first support portion, the first connecting portion, and the second clamping portion form a triangular structure. One end of the second clamping portion away from the second support portion is a free end. The free end of the second clamping portion is movable up and down. The first clamping portion and the third clamping portion cooperate with each other to clamp a wire inserting into the triangular structure.

In the embodiment of the present disclosure a terminal is conveniently fixed to an external environment through welding feet. In addition, the triangular structure makes a structure of the at least one conductive assembly stable, and greatly improves service life of the plug-in terminal block.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

1—back cover; 2—operating component; 3—housing; 4—first limit groove; 5—conductive component; 6—conductive assembly; 7—clamping component; 8—fixing portion; 9—first clamping connecting portion; 10—first limit through hole; 11—first clamping portion; 12—first connecting portion; 13—first support portion; 14—welding foot; 15—second support portion; 16—first limit portion; 17—third clamping portion; 18—second clamping portion; 19—second connecting portion; 20—driving hole; 21—second limit protrusion; 22—mounting hole; 23—first limit protrusion; 24—conductor cavity; 25—second limit groove; 26—fourth limit groove; 27—third limit groove; 28—wire hole; 29—pressing groove; 30—driving portion; 31—abutting portion; 32—second clamping connecting portion; 33—wire groove; 34—buckle portion; 35—reinforcing rib; 36—wire storage groove.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. Therefore, following detailed description of the embodiments of the present disclosure provided in the accompanying drawings is not intended to limit the scope of the present disclosure, but merely represents selected embodiments of the present disclosure. Based on the embodiments of the present disclosure, all other embodiments obtained by a person of ordinary skill in the art without creative work shall fall within the protection scope of the present disclosure.

It should be understood that in the description of the present disclosure terms such as "central", "lateral", "lengthways", "length", "width", "thickness", "upper", "lower", "left", "right", "vertical", "horizontal", "top", "bottom", "inner", "outer", "clockwise", "counterclockwise", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified.

It should be noted in the description of the present disclosure that, unless otherwise regulated and defined, terms such as "installation," "bonded," and "connection" shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

In the present disclosure, unless expressly stipulated and defined otherwise, the first feature is arranged "above" or "below" the second feature may mean that the first feature directly contact the second feature, or the first feature does not directly contact the second feature but connected with the second feature through other features between them. Furthermore, the first feature is arranged "on", "above" or "over" the second feature means that the first feature may arrange directly above and obliquely above the second feature, or it may merely indicate that a level of the first feature is greater than a level of the second feature. The first feature is arranged "below", "under", and "beneath" the second feature means that the first feature is arranged directly below and obliquely below the second feature, or it simply means that the level of the first feature is less than the level of second feature.

The present disclosure will be further described in detail below in conjunction with the drawings and specific embodiments:

As shown in FIGS. 1-13, the present disclosure provides a plug-in terminal block. The plug-in terminal block comprises at least one conductive assembly 6. The at least one conductive assembly 6 comprises a conductive component 5 and a clamping component 7. The conductive component 5 is connected with a housing assembly. The clamping component 7 is arranged on the conductive component 5.

Figure 6:
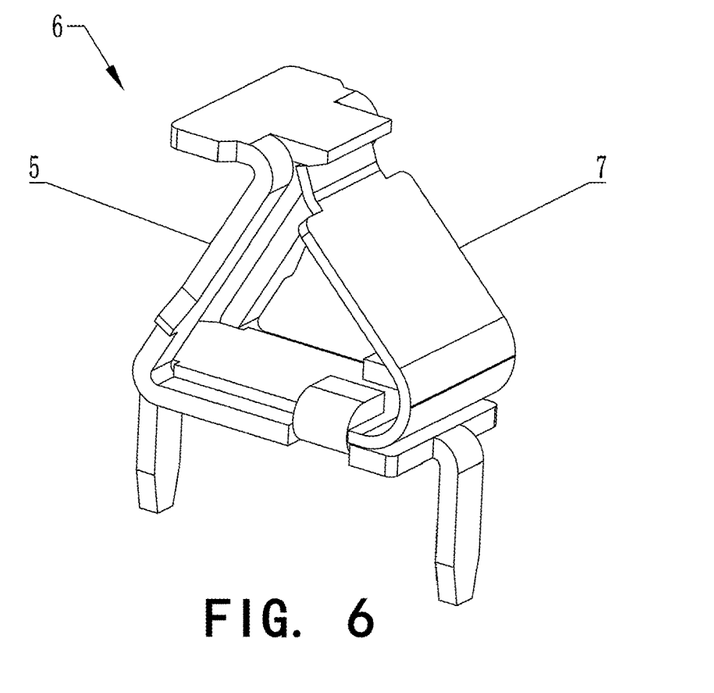
FIG. 6 is a perspective schematic diagram of a conductive assembly.
Figure 7:
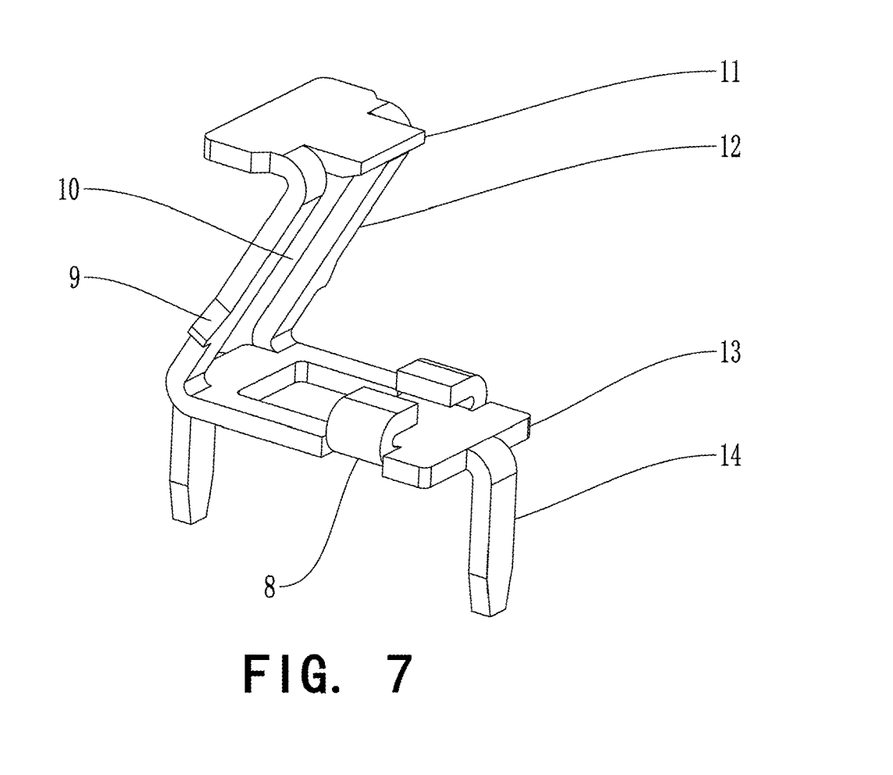
FIG. 7 is a perspective schematic diagram of a conductive component.
Figure 8:
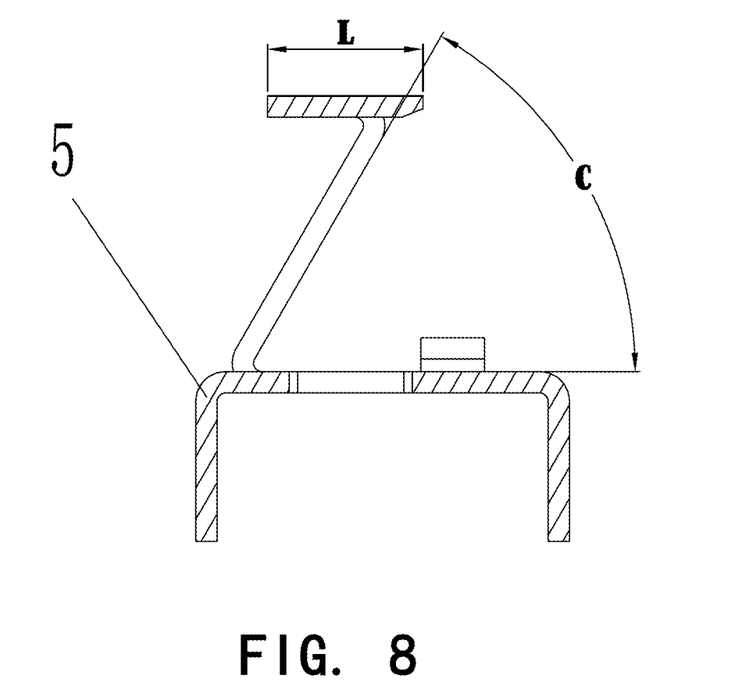
FIG. 8 is a cross-sectional schematic diagram of the conductive component.

The conductive component 5 comprises a first support portion 13, a first clamping portion 11, a first connecting portion 12, and welding feet 14. The first connecting portion 12 and the welding feet 14 separately extend along different directions from the first support portion 13. The first clamping portion 11 is connected with the first connecting portion 12.

Figure 9:
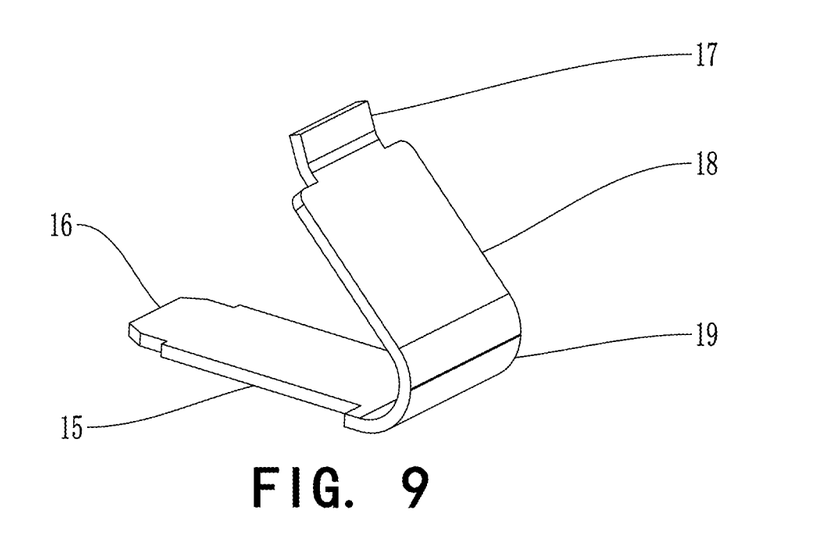
FIG. 9 is a perspective schematic diagram of a clamping component.
Figure 10:
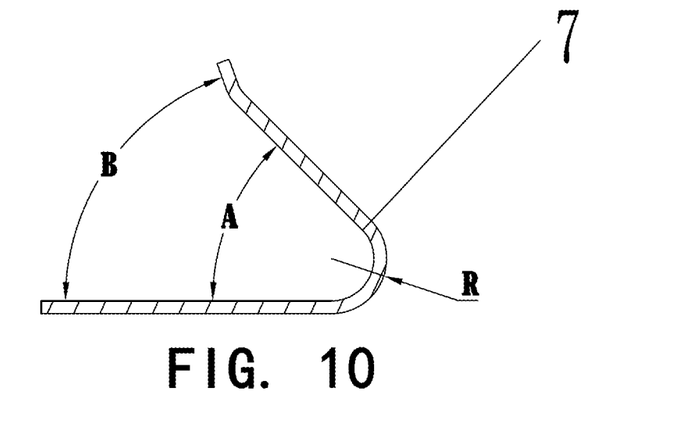
FIG. 10 is a cross-sectional schematic diagram of the clamping component.

The clamping component 7 comprises a second support portion 15, a second clamping portion 18, and a third clamping portion 17. The third clamping portion 17 extends outward from the second clamping portion 18. The second support portion 15 is arranged on the first support portion 13. The second clamping portion 18 is arranged above the second support portion 15. The first support portion 13, the first connecting portion 12, and the second clamping portion 18 form a triangular structure. One end of the second clamping portion 18 away from the second support portion 15 is a free end. The free end of the second clamping portion 18 is movable up and down. The first clamping portion 11 and the third clamping portion 17 cooperate with each other to clamp a wire between the first clamping portion 11 and the third clamping portion 17.

Figure 1:
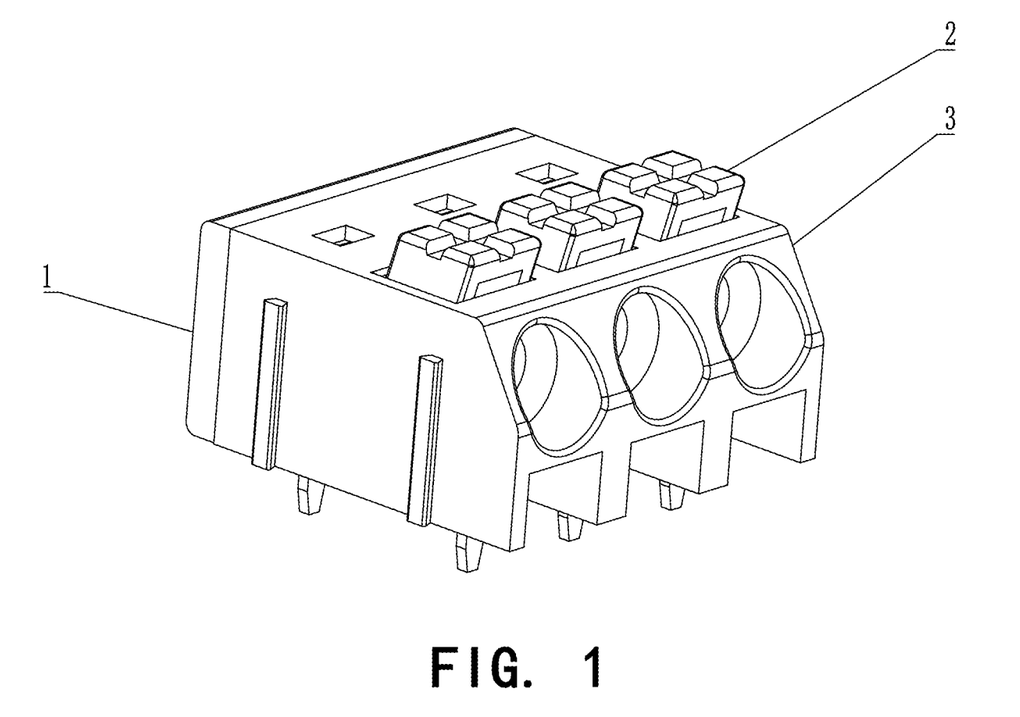
FIG. 1 is a perspective schematic diagram of a plug-in terminal block.
Figure 2:
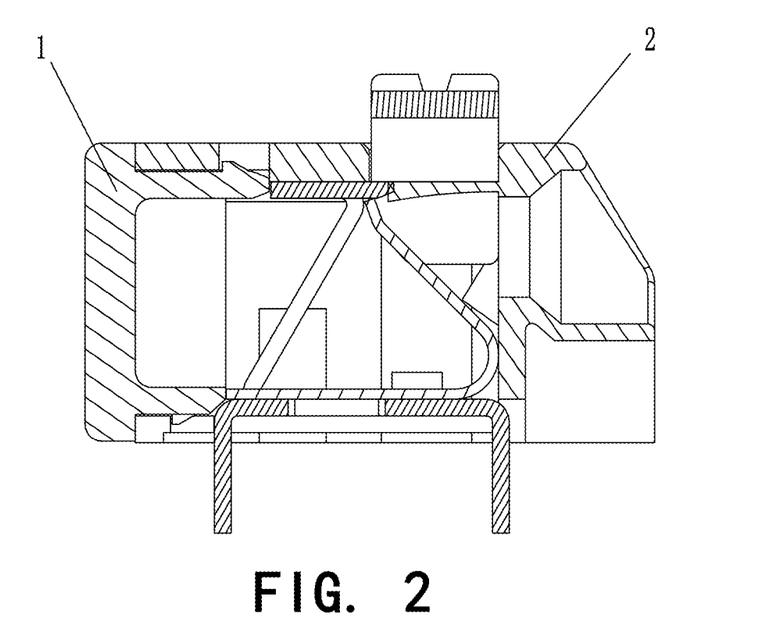
FIG. 2 is a cross-sectional schematic diagram of the plug-in terminal block.

It is understood that the plug-in terminal block drives the second clamping portion 18 away from the first clamping portion 11 by mounting the at least one conductive assembly 6 in a housing 3 and arranging the operating component 2 on the housing 3, so the wire is able to pass through a conductor gap. When no external force is applied, the second clamping portion 18 moves close to the first clamping portion 11 due to action of elastic potential energy, thereby cooperating with the first clamping portion 11 and the third clamping portion 17 to clamp the wire.

An angle between the second clamping portion 18 and the second support portion 15 and an angle between the first connecting portion 12 and the first support portion 13 are acute angles. As a result, one end of the second clamping portion 18 and one end of the first connecting portion 12 are close to each other. Therefore, the wire is stably clamped, structural stability of the at least one conductive assembly 6 is greatly improved. Even long-term use or frequent plugging and unplugging of the wire will not affect service life of the plug-in terminal block.

Moreover, the plug-in terminal block is conveniently fixed in an external environment (such as a PCB) through the welding feet 14.

Optionally, in the embodiment, the welding feet 14 are plug-in welding feet 14. Specifically, the welding feet 14 extend from two ends of the first support portion 13 in a length direction toward a direction away from the first clamping portion 11. It is understood that the second clamping portion 18 and the first clamping portion 11 are configured to clamp the wire, and they are bound to be arranged above the PCB. Therefore, the welding feet 14 need to extend downward the PCB board. That is, the welding feet 14 extend toward a direction away from the first clamping portion 11.

In other embodiments, the welding feet 14 may be configured as chip welding feet 14 that extend in a direction parallel to the first support portion 13 to form a bonding pad.

As shown in FIGS. 6-10, based on the foregoing embodiments, in one optional embodiment of the present disclosure, the first connecting portion 12 comprises a first limit through hole 10. The clamping component 7 comprises a first limit portion 15 extending outward from an end of the second support portion 15. The first limit portion 15 is embedded in the first limit through hole 10.

Figure 3:
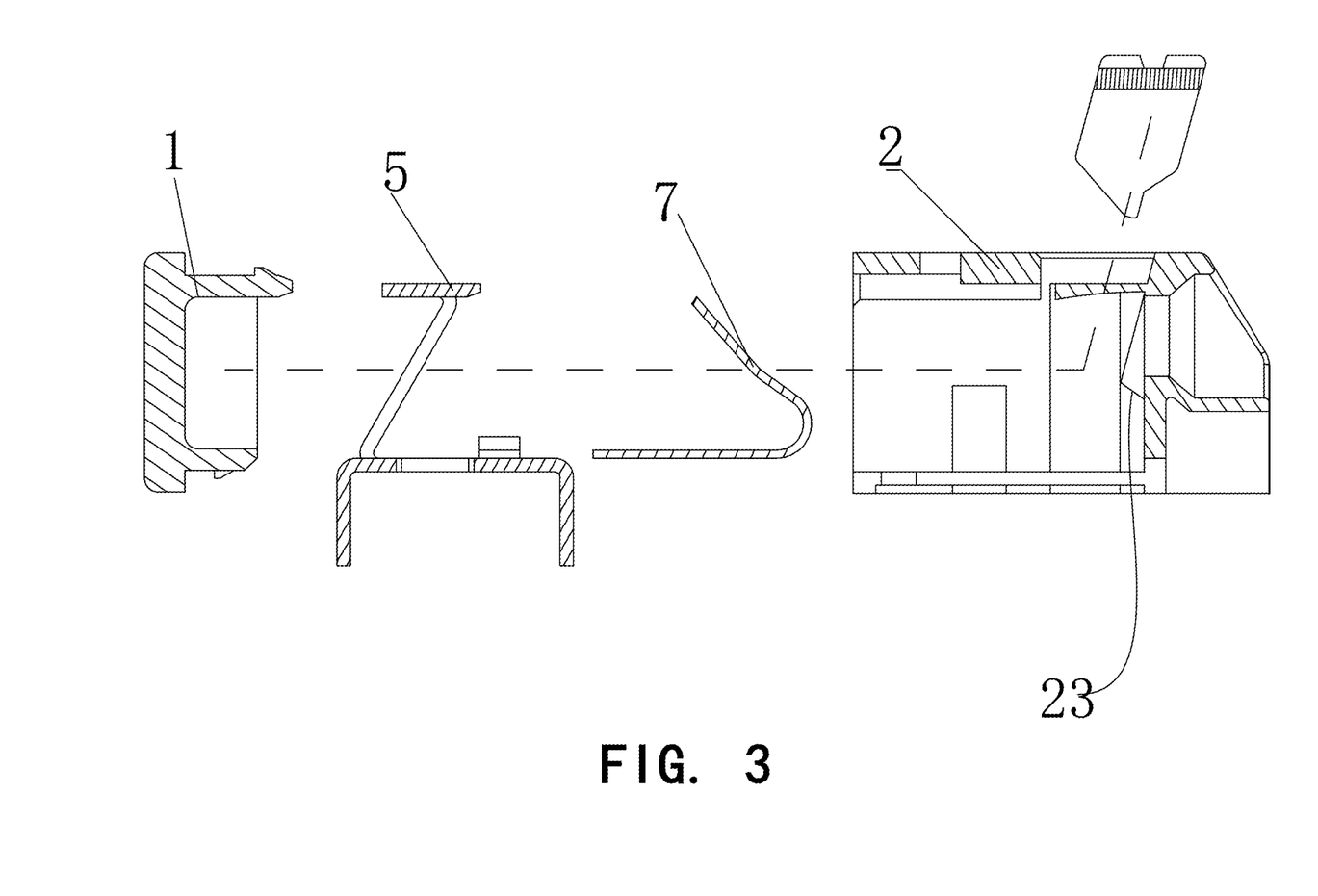
FIG. 3 is an exploded perspective schematic diagram of the plug-in terminal block.
Figure 4:
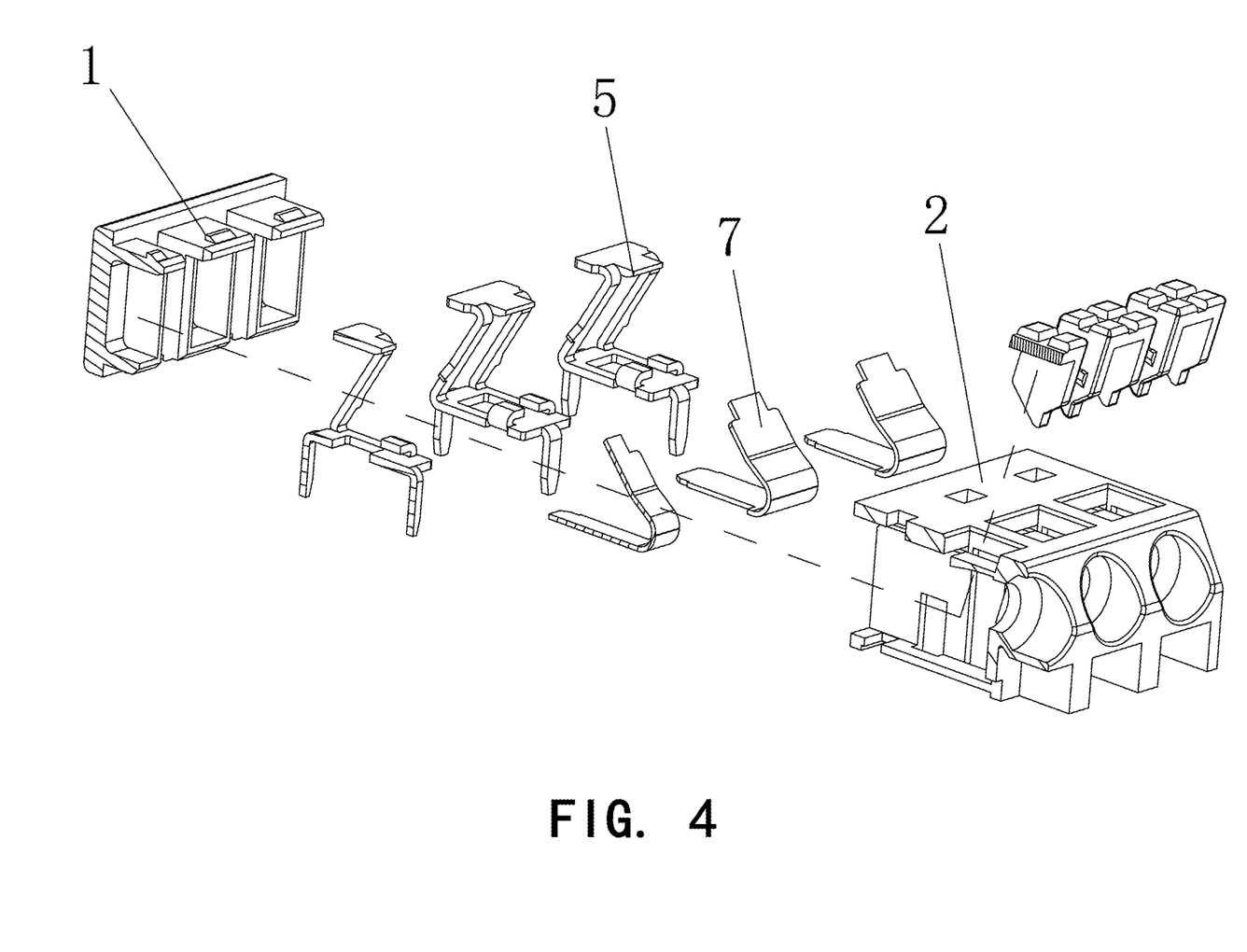
FIG. 4 is another exploded perspective schematic diagram of the plug-in terminal block.

Optionally, a width of the second support portion 15 is greater than a width of the first limit through hole 10, so the second support portion 15 abuts against the first connecting portion 12 when the first limit portion 16 is inserted into the first limit through hole 10 to realize positioning of the first limit portion. Specifically, as shown in FIGS. 3-4, when the clamping component 7 is mounted to the conductive component 5, the clamping component 7 is moved horizontally directly along an upper surface of the first support portion 13 until the first limit portion 16 is inserted into the first limit through hole 10. Therefore, the second support portion 15 is prevented from shaking left and right on the first support portion 13. Because the width of the second support portion 15 is greater than the width of the first limit through hole 10, the clamping component 7 is positioned on the conductive component 5.

As shown in FIGS. 6-10, based on the foregoing embodiments, in one optional embodiment of the present disclosure, the first support portion 13 and the second supporting portion 15 are closely attached to each other. The conductive component 5 further comprises fixing portions 8. The fixing portions 8 are connected with the first support portion 13 to fix the second support portion 15.

Specifically, in the embodiment, the fixing portions 8 extend outward from the first support portion 13. The fixing portions 8 are hook-like structures and are configured to clamp and fix the second support portion 15. Two fixing portions 8 are arranged on two sides of the first support portion 13.

Optionally, a lightening through hole is on a middle portion of the first support portion 13.

It is understandable that the fixing portions of the hook-like structures extend from the two sides of the first support portion 13 to clamp the clamping component 7, which limit the clamping component 7 from shaking in a width direction of the first support portion 13, greatly avoid loosening of the clamping component 7 after long-term use, and have good practical significance.

In other embodiments, only one fixing portion 8 is provided, and the fixing portion 8 is extended from an inner wall of the lightening through hole instead of extending from one side of the first support portion 13, or the fixing portion 8 is a rivet. In the present disclosure, a specific structure of the fixing portion 8 is not limited as long as it fixes the clamping component 7 on the first support portion 13.

As shown in FIGS. 9-10, based on the foregoing embodiments, in one optional embodiment of the present disclosure, the clamping component 7 further comprises a second connecting portion 19. The second connecting portion 19 is configured to connect the second support portion 15 with the second clamping portion 18. The fixing portions 8 abut against portions of the second support portion 15 close to the second connecting portion 19.

Specifically, a position of the portions of the second support portion 15 close to the second connecting portion 19 may be a position of one-third, one-fourth, or one-fifth of the second support portion 15 as long as the position where the fixing portions 8 abut against is closer to the second connecting portion 19, so that the clamping component 7 is prevented from shaking left and right on the first support portion 13.

It should be noted that the fixing portions 8 abut against the portions of the second support portion 15 close to the second connecting portion 19, which means that only if parts of the fixing portions 8 abut against portions of the second support portion 15 close to the second connecting portion 19, it falls within the protection scope of the present disclosure. There is no need to limit that all of the fixing portions 8 must abut against the second supporting portion 15 close to the second connecting portion Specifically, the second connecting portion 19 is arc-shaped. An outer radius R of the second connecting portion 19 ranges from 1-1.5 mm. It is understood that the second connecting portion 19 is arc-shaped, so the second clamping portion 18 is able to move up and down, and the clamping component 7 still has good elasticity after multiple uses and long-term use.

Optionally, a width of the second connecting portion 19 is greater than a width of the second support portion 15. The fixing portions 8 clamp the second support portion 15. Specifically, when the width of the second connecting portion 19 is greater than the width of the second support portion 15, the second connecting portion 19 is able to abut against the fixing portions 8 to realize positioning on a horizontal direction, which limits a mounting position of the clamping component 7 on the first support portion 13 and has good practical significance.

As shown in FIGS. 6-10, based on the foregoing embodiments, in one optional embodiment of the present disclosure, the first limit through hole 10 extends from the first support portion 13 to the first clamping portion 11. The third clamping portion 17 extends outward from the free end of the second clamping portion 18. A width of the third clamping portion 17 is no more than a width of the first limit through hole 10. When the wire is clamped in the triangular structure, the third clamping portion 17 and the wire are embedded in the first limit through hole 10.

Optionally, a width of the second clamping portion 18 is greater than the width of the first limit through hole 10. The width of the third clamping portion 17 is equal to a width of the first limit portion 16. The width of the second connecting portion 19 is equal to the width of the second clamping portion 18.

Specifically, the third clamping portion 17 is embedded in the first limit through hole 10 to limit a freedom degree of the third clamping portion 17 in a width direction. Thus, the third clamping portion 17 is only able to move along an extending direction of the first limit through hole 10, which not only well prevents the clamping component 7 from deforming but also well wraps the wire well from all around, Further, it greatly increases a contact area between the wire and the at least one conductive assembly 6 and has very good practical significance.

It is understood that the width of the second clamping portion 18 is greater than the width of the first limit through hole 10. That is, the width of the second clamping portion 18 is greater than the width of the third clamping portion 17, so the second clamping portion 18 provides a large elastic force to clamp the wire. Similarly, the width of the second connecting portion 19 is equal to the width of the second clamping portion 18, which provides large elastic force to the third clamping portion 17.

As shown in FIGS. 8 and 10, based on the foregoing embodiments, in one optional embodiment of the present disclosure, a length L of the first clamping portion 11 extending along a direction of the wire ranges from 3.4-4.5 mm. An included angle C between the first connecting portion 12 and the first support portion 13 ranges from 55-65°. In a natural state where the wire is not clamped: an included angle A between the second clamping portion 18 and the second support portion 15 ranges from 40-50°. An included angle B between the third clamping portion 17 and the second support portion 15 ranges from 65-75°.

Optionally, in the embodiment, a middle portion of the second clamping portion 18 is bent to increase the included angle between the third clamping portion 17 and the second support portion 15, so that clamping force acting on the wire is greater. In other embodiments, a connecting position of the second clamping portion 18 and the third clamping portion 17 is directly bent, which realizes a same effect.

Specifically, the length L of the first clamping portion 11 is approximately 3.6 mm, so that the first clamping portion 11 fully contacts the wire, effectively avoiding poor contact. The included angle C between the first connecting portion 12 and the first support portion 13 is 60°. In the natural state where the wire is not clamped: the included angle A between the second clamping portion 18 and the second support portion 15 is 45°, and the included angle B between the third clamping portion 17 and the second supporting portion 15 is 70°.

It is understood that these included angles not only ensure that the wire receives sufficient clamping force in the conductor gap but also ensures that an acute angle is formed between the third clamping portion 17 and the wire in a clamped state to clamp the wire, which further prevent the wire from moving.

As shown in FIG. 9, based on the foregoing embodiments, in one optional embodiment of the present disclosure, the width of the first limit portion 16 and the width of third clamping portion 17 range from 2.4-2.6 mm. The width of the second clamping portion 18 and the width of the second connecting portion 19 range from 3.8-4.2 mm. The width of the second support portion 15 ranges from 2.8-3.1 mm.

Specifically, the width of the first limit portion 16 and the width of the third clamping portion 17 are 2.5 mm. The width of the second clamping portion 18 and the width of the second connecting portion 19 are 4 mm. The width of the second support portion 15 is 2.9 mm. It is understood that in order to make the third clamping portion 17 and the first limit portion 16 to move smoothly in the first limit through hole 10, the width of the first limit through hole 10 is 2.6 mm. Therefore, a 2.5 square copper wires (about 1.78 mm in diameter) is able to receive in the first limit through hole 10.

As shown in FIGS. 1-5 and 11-13, based on the foregoing embodiments, in one optional embodiment of the present disclosure, the plug-in terminal block further comprises the housing assembly. The housing assembly comprises a housing 3.

Figure 11:
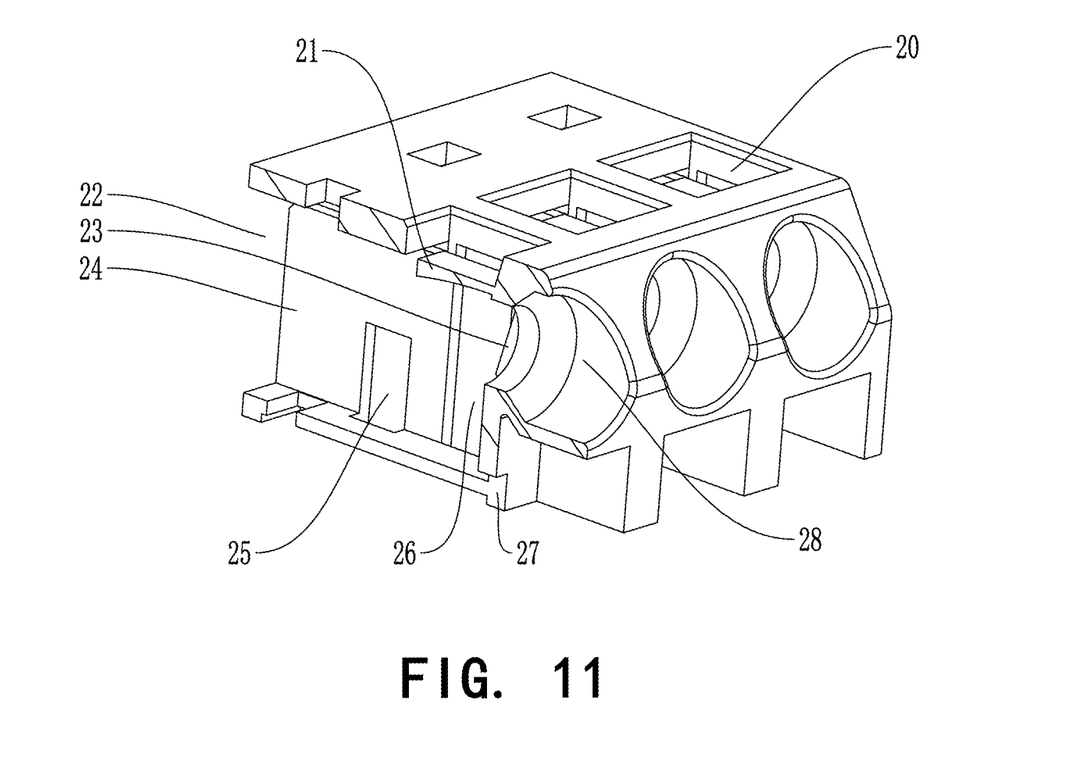
FIG. 11 is a perspective cross-sectional schematic diagram of a housing.

The housing 3 comprises a top portion and a bottom portion. A conductor cavity 24 configured to accommodate the at least one conductive assembly 6 is formed between the top portion and the bottom portion. The at least one conductive assembly 6 is arranged in the conductor cavity 24. First side walls of the conductor cavity 24 are provided with first limit grooves 4. Two sides of the first clamping component 7 are embedded in the first limit grooves 4.

Figure 5:
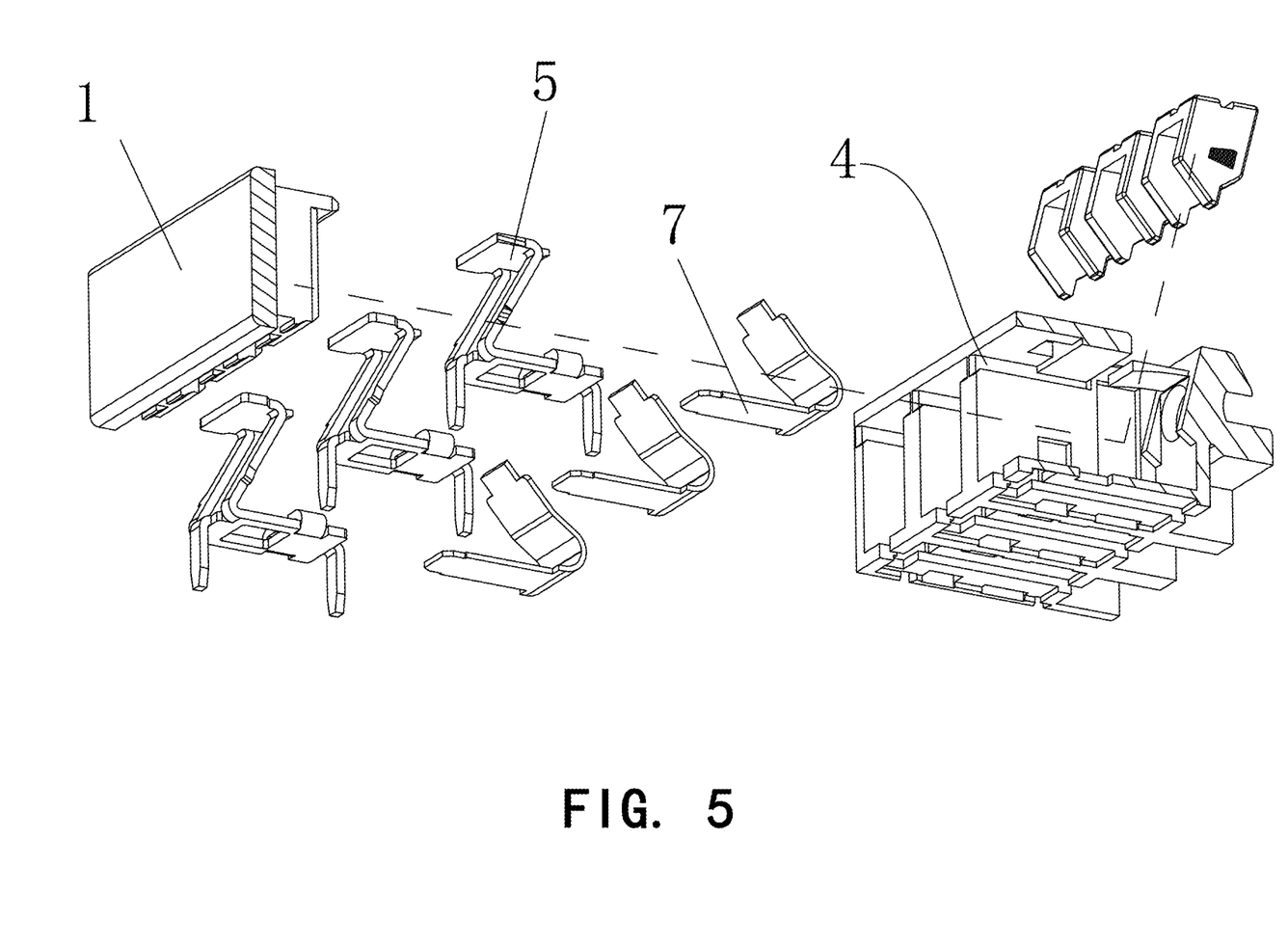
FIG. 5 is another exploded perspective schematic diagram of the plug-in terminal block.

Specifically, as shown in FIGS. 3 and 5, the first limit grooves 4 are provided on two first side walls of the conductor cavity 24. When the first clamping component 7 enters the conductor cavity 24, two sides of the first clamping component 7 are respectively embedded in the first limit grooves 4, so as to prevent the first clamping component 7 from shaking or deforming and ensure the position of the first clamping component 7 so that the wire smoothly embed in the first limit through hole 10.

As shown in FIGS. 2-5 and 11, based on the foregoing embodiments, in one optional embodiment of the present disclosure, the housing 3 comprises at least one wire hole 28 and at least one mounting hole 22 communicated with the at least one wire hole 28. The at least one mounting hole 22 and the at least one wire hole 28 penetrate the conductor cavity 24 along a same axis. The at least one conductive assembly 6 passes through the at least one mounting hole 22 to embed in the conductor cavity 24. The housing assembly further comprises a back cover 1 At least part of the back cover 1 is inserted into the at least one mounting hole 22 to be arranged in the at least one mounting hole 22 and cover the at least one mounting hole 22.

Specifically, the at least one mounting hole 22 and the at least one wire holes are on the same axis, which means that the at least one mounting hole 22 and the at least one wire hole respectively communicate with the conductor cavity 24 from two opposite directions, so that the conductor cavity 24 is a through cavity. The back cover 1 is directly inserted into the at least one mounting hole 22 from one side of the at least one mounting hole away from the at least one wire hole 28 to limit the position of the at least one conductive assembly 6 in the conductor cavity 24 and prevent the at least one conductive assembly from separating from the conductor cavity 24.

Figure 13:
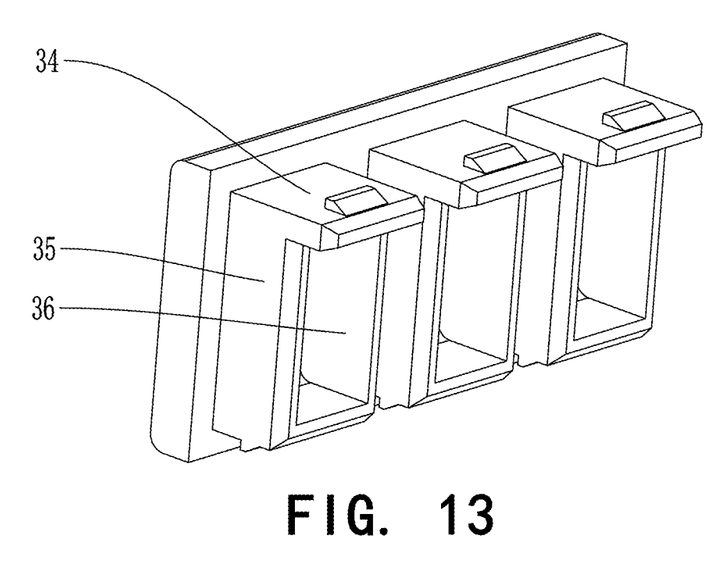
FIG. 13 is a perspective schematic diagram of a back cover.

As shown in FIG. 13, based on the foregoing embodiments, in one optional embodiment of the present disclosure, the back cover 1 comprises at least two buckle portions 34 extended into the at least one mounting hole 22 to buckle and fix to the conductor cavity 24. The back cover 1 further comprises reinforcing ribs 35 connected with the at least two buckle portions 34. A wire storage groove 36 configured to accommodate the wire is formed between the at least two buckle portion 34 and the reinforcing ribs 35.

Specifically, the back cover 1 is fixed on the at least one mounting hole 22 through the buckle portions 34, which has a simple structure and greatly reduces an overall volume of the plug-in terminal block. Through the reinforcing ribs 35, the buckle portions 34 are effectively prevented from deforming, and service life of the back cover 1 is ensured. The wire storage groove 36 is formed between the reinforcing ribs 35 and the buckle portions 34 to limit a size of the wire in the conductor cavity 24.

As shown in FIG. 11, based on the foregoing embodiments, in one optional embodiment of the present disclosure, the bottom portion of the housing 3 is cut and extends toward the top portion and is communicated with the conductor cavity 24 to form second limit grooves 25 on the first side walls of the conductor cavity 24, first clamping connecting portions 9 are arranged on two sides of the first connecting portion 12. The first clamping connecting portions 9 are embedded in the second limit grooves 25.

Specifically, the first limit through hole 10 is on the middle portion of the first connecting portion 12. Therefore, two sides of the first connecting portion 12 have certain elasticity. In a process of mounting the at least one conductive assembly 6 into the conductor cavity 24, the first connecting portion 12 is elastically deformed, so that the second clamping portions 9 abut against the first side walls of the conductor cavity 24. When moving to a predetermined position, the second clamping portions 9 are inserted into the second limit grooves 25 under action of the elastic potential energy. Therefore, the at least one conductive assembly is fixed 6 in the conductive cavity 24. Through the buckle structure, the at least one conductive assembly 6 is stably mounted in the conductor cavity 24, and the at least one conductive assembly 6 is not easily damaged when used for a long time.

As shown in FIGS. 2, 4, 5 and 11, based on the foregoing embodiments, in one optional embodiment of the present disclosure, the top portion of the housing 3 comprises at least one third limit groove 27. The at least one third limit groove 27 is communicated with the conductor cavity 24. The welding feet 14 pass through the at least one third limit groove 27. The at least one third limit groove 27 and the first limit groove 4 are communicated with the at least one mounting hole 22.

Specifically, the at least one third limit groove 27 and the first limit groove 4 extend to an opening of the at least one mounting hole 22. When the at least one conductive assembly 6 is mounted into the conductor cavity 24, it is only necessary to push the whole conductive assembly 6 from the at least one mounting hole 22 into the conductor cavity 24, which is simple in structure, is convenient in assembly operation, and has a good practical significance.

As shown in FIGS. 1, 5 and 11-12, based on the foregoing embodiments, in one optional embodiment of the present disclosure, the top portion of the housing comprises at least one driving hole 20 communicated with the conductor cavity 24. The housing assembly further comprises at least one operating component 2 movably arranged in the at least one driving hole 20. The at least one operating component 2 is configured to drive the second clamping portion 18 away from the first clamping portion 11 under external force.

Figure 12:
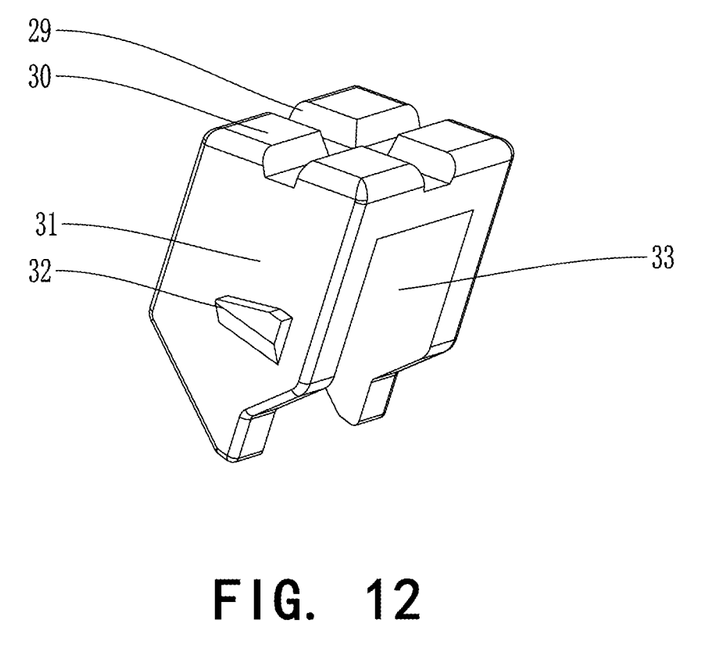
FIG. 12 is a perspective schematic diagram of an operating component.

The at least one operating component 2 comprises a driving portion 30 and two abutting portions 31 arranged on two sides of the driving portion 30. The abutting portions 34 define second clamping connecting portions 32. The second clamping connecting portions 32 abut against the first side walls of the conductor cavity 24. The two abutting portions 31 separately abut against the second clamping portion 18. A wire groove 33 for the wire to pass is formed between the two abutting portions 31.

Optionally, the bottom portion of the housing is cut and extends toward the top portion of the housing. The bottom portion is communicated with the conductor cavity 24 to form fourth limit grooves 26 on the first side walls of the conductor cavity 24. The second clamping connecting portions 32 are embedded in the fourth limit grooves 26. The second clamping connecting portions 32 are slidable in the fourth limit grooves 26.

Specifically, the housing 3 is a thin housing that wraps the conductive assembly 6. Therefore, a volume of the whole plug-in terminal block is greatly reduced. The at least one operating component 2 has a C-shaped structure, and the two sides of the at least one operating component 2 are respectively clamped in the first limiting grooves 26 on the first side walls of the conductor cavity 24. A volume of the at least one operating component 2 is greatly reduced by the clamping and sliding method, so that the volume of the plug-in terminal block is greatly reduced. Especially, a height of the plug-in terminal block is greatly reduced.

Optionally, a pressing groove 29 for pressing by an external object is provided on a top portion of the at least one operating component 2. Specifically, in this embodiment, the pressing groove 29 is cross-shaped. In other embodiments, the pressing groove 29 may be a grid or a straight groove. The specific structure of the pressing groove 29 is not limited thereto.

As shown in FIGS. 1-5 and 11-12, based on the foregoing embodiments, in one optional embodiment of the present disclosure, the at least one driving hole 20 comprises at least one inclined side wall. The at least one operating component 2 is embedded in the at least one driving hole 20 and is slidable along the at least one inclined side wall of the at least one driving hole 20.

Specifically, a bottom portion of the at least one operating component is provided with an inclined surface configured to cooperate with the second clamping portion 18. Since the second clamping portion 18 is arranged obliquely in the conductor cavity 24, if the operating component 2 is slid straightly up and down, a part of driving force is decomposed by the second clamping portion 18, and only a small part of the driving force is applied to drive the second clamping portion 18 to move away from the first clamping portion 11. Therefore, in the embodiment, the at least one operating component 2 is configured as a button and is mounted in the driving hole 20. A sliding track of the operating component 2 is set to be inclined, so that an the included angle between sliding track of the at least one operating component 2 and the first clamping portion 11 is closer to 90 degrees, so that the pressure exerted on the at least one operating component 2 is more distributed to drive the second clamping portion 18 to move away from the first clamping portion, which makes an operation of the plug-in terminal block labor-saving and has a good practical significance.

As shown in FIGS. 2-3 and 11, based on the foregoing embodiments, in one optional embodiment of the present disclosure, at least one first limit protrusion 23 is arranged on a second side wall of the conductor cavity 24 close to the at least one wire hole 28. The at least one first limit protrusion 23 comprise a first limit inclined surface. The first limit inclined surface is configured to limit an angle of the second clamping portion 18 when the wire is not clamped.

Specifically, the clamping component 7 is a V-shaped plate structure. The at least one first limit protrusion 23 effectively prevents a problem that when the second clamping portion 18 of the clamping component 7 is pulled, an angle of the clamping component 7 becomes larger when the wire is inserted and unplugged. Therefore, it is ensured that the third clamping portion 17 is always located in the first limit through hole 10 and will not fall out due to deformation of the second clamping portion 18 and the second connecting portion 19, which ensures the stability of internal structures of the plug-in terminal block, so it is not damaged after repeated use.

Optionally, two first limit protrusions 23 are provided. The two first limit protrusions 23 are respectively arranged on two sides of the at least one wire hole 28, which make the force on the second clamping portion balanced and make the second clamping portion not easy to deform.

As shown in FIGS. 2-3 and 11, based on the foregoing embodiments, in one optional embodiment of the present disclosure, the first limit protrusions are arranged on the first side walls of the conductor cavity 24 close to the at least one wire hole 28. The first limit protrusions comprise second limit inclined surfaces. The second limit inclined surfaces extend to the at least one inclined side wall of the at least one driving hole 20. The at least one operating component 2 is slidable along the second limit inclined surfaces.

Specifically, the second limit inclined surfaces of the first limit protrusions and the inclined side wall of the driving hole 20 are arranged coplanar, so that the at least one operating component 2 slides smoothly.

As shown in FIGS. 7-12, based on the foregoing embodiments, in one optional embodiment of the present disclosure, at least one second limit protrusion 21 is arranged on a second side wall of the conductor cavity 24 close to the at least one wire hole 28. The at least one second limit protrusion 21 directly face the at least one driving hole 20. A driving gap for the abutting portions 31 to pass through is formed between the second side wall of the conductor cavity 24 and the at least one second limit protrusion 21.

One end of the second limit protrusion 21 away from the at least one wire hole 28 is defined as a free end swinging up and down. Two ends of the first clamping portion 11 separately abut against the free ends of the second limit protrusion 21 and the back cover 1. A lowest point of the free end of the second limit protrusion 21 is no more than a lowest point of the first clamping portion 11. A guiding inclined surface is defined on tone side of the first clamping portion 11 facing the free end of the at least one second limit protrusion 21.

Specifically, through the at least one second limit protrusion 21, the wire is well guided from the wire hole 28 to the conductor gap. Therefore, the wire will not be bent when it is halfway through, so the wire smoothly enters the conductor gap, which has good practical significance.

One end of the at least one second limit protrusion 21 is the free end, which is able to swing up and down to a certain extent to avoid breaking when the at least one operating component 2 is pressed, which has good practical significance.

Optionally, a side surface of the at least one second limit protrusion 21 away from the at least one driving hole 20 is a curved surface. Through the curved surface gradually extending downward, the wire is well guided into the conductor gap The above are only optional embodiments of the present disclosure and cannot be interpreted as limiting of the protection scope of the present disclosure. For those skilled in the art, the present disclosure can have various modifications and changes. Any modification, equivalent replacement, improvement, etc. made within the spirit and principle of the present disclosure should be included in the protection scope of the present disclosure.

What is claimed is:

1. A plug-in terminal block, comprising at least one conductive assembly;
    wherein the at least one conductive assembly comprises a conductive component and a clamping component; the conductive component is connected with a housing assembly; the clamping component is arranged on the conductive component;
    wherein the conductive component comprises a first support portion, a first clamping portion, a first connecting portion, and welding feet; the first connecting portion and the welding feet separately extend along different directions from the first support portion; the first clamping portion is connected with the first connecting portion;
    wherein the clamping component comprises a second support portion and a second clamping portion; the second support portion is arranged on the first support portion; the second clamping portion is arranged above the second support portion;
    wherein the clamping component further comprises a third clamping portion extending outward from the second clamping portion;
    wherein the first support portion, the first connecting portion, and the second clamping portion form a triangular structure; one end of the second clamping portion away from the second support portion is a free end; the free end of the second clamping portion is movable up and down; the first clamping portion and the third clamping portion cooperate with each other to clamp a wire between the first clamping portion and the third clamping portion.

2. The plug-in terminal block according to claim 1, wherein a length of the first clamping portion extending along a direction of the wire ranges from 3.4-4.5 mm.

3. The plug-in terminal block according to claim 1, wherein the plug-in terminal block further comprises the housing assembly; the housing assembly comprises a housing;
    wherein the housing comprises a top portion and a bottom portion; a conductor cavity configured to accommodate the at least one conductive assembly is formed between the top portion and the bottom portion of the housing;
    wherein the at least one conductive assembly is arranged in the conductor cavity; first side walls of the conductor cavity are provided with first limit grooves; two side of the first clamping component are embedded in the first limit grooves.

4. The plug-in terminal block according to claim 3, wherein the bottom portion of the housing is cut and extends toward the top portion of the housing and is communicated with the conductor cavity to form second limit grooves on the first side walls of the conductor cavity; first clamping connecting portions are arranged on two sides of the first connecting portion; the first clamping connecting portions are embedded in the second limit grooves.

5. The plug-in terminal block according to claim 1, wherein the conductive component further comprises fixing portions; the fixing portions are connected with the first support portion to fix the second support portion.

6. The plug-in terminal block according to claim 5, wherein the clamping component further comprises a second connecting portion; the second connecting portion is configured to connect the second support portion with the second clamping portion; the fixing portions abut against portions of the second support portion close to the second connecting portion.

7. The plug-in terminal block according to claim 5, wherein the first connecting portion comprises a first limit through hole; the clamping component comprises a first limit portion extending outward from an end of the second support portion; the first limit portion is embedded in the first limit through hole.

8. The plug-in terminal block according to claim 7, wherein the first limit through hole extends from the first support portion to the first clamping portion;
    wherein the third clamping portion extends outward from the free end of the second clamping portion; a width of the third clamping portion is no more than a width of the first limit through hole; when the wire is clamped in the triangular structure, the third clamping portion and the wire are embedded in the first limit through hole.

9. The plug-in terminal block according to claim 1, wherein the housing comprises at least one wire hole and at least one mounting hole communicated with the at least one wire hole; the at least one mounting hole and the at least one wire hole penetrate the conductor cavity along a same axis; the at least one conductive assembly passes through the at least one mounting hole to embed in the conductor cavity;
    wherein the housing assembly further comprises a back cover; at least a part of the back cover is inserted into the at least one mounting hole to be arranged in the at least one mounting hole and cover the at least one mounting hole.

10. The plug-in terminal block according to claim 9, wherein the back cover comprises at least two buckle portions extended into the at least one mounting hole to buckle and fix to the conductor cavity;
    wherein the back cover further comprises reinforcing ribs connected with the at least two buckle portions; a wire storage groove configured to accommodate the wire is formed between the at least two buckle portion and the reinforcing ribs.

11. The plug-in terminal block according to claim 9, wherein the top portion of the housing comprises at least one third limit groove; the at least one third limit groove is communicated with the conductor cavity; the welding feet pass through the at least one third limit groove;

wherein the at least one third limit groove and the first limit groove are extended from the at least one mounting hole to the conductor cavity.

12. The plug-in terminal block according to claim 9, wherein at least one first limit protrusion is arranged on a second side wall of the conductor cavity close to the at least one wire hole; the at least one first limit protrusion comprises a first limit inclined surface; the first limit inclined surface is configured to limit an angle of the second clamping portion when the wire is not clamped.

13. The plug-in terminal block according to claim 9, wherein the top portion of the housing comprises at least one driving hole communicated with the conductor cavity;

wherein the housing assembly further comprises at least one operating component movably arranged in the at least one driving hole; the at least one operating component is configured to drive the second clamping portion to move away from the first clamping portion under external force;

wherein the at least one operating component comprises a driving portion and two abutting portions arranged on two sides of the driving portion; the two abutting portions define second clamping connecting portions; the second clamping connecting portions abut against first side walls of the conductor cavity; the two abutting portions separately abut against the second clamping portion; a wire groove for the wire to pass is formed between the two abutting portions.

14. The plug-in terminal block according to claim 13, wherein the bottom portion of the housing is cut and extends toward the top portion of the housing; the bottom portion of the housing is communicated with the conductor cavity to form fourth limit grooves on the first side walls of the conductor cavity; the second clamping connecting portions are embedded in the fourth limit grooves; the second clamping connecting portions are slidable in the fourth limit grooves.

15. The plug-in terminal block according to claim 13, wherein at least one second limit protrusion is arranged on a second side wall of the conductor cavity close to the at least one wire hole; the at least one second limit protrusion directly face the at least one driving hole; a driving gap for the abutting portions to pass through is formed between the first side walls of the conductor cavity and the at least one second limit protrusion;

wherein one end of the second limit protrusion away from the at least one wire hole is defined as a free end swinging up and down; two ends of the first clamping portion separately abut against the free end of the second limit protrusion and the back cover; a lowest point of the free end of the second limit protrusion is no more than a lowest point of the first clamping portion.

16. The plug-in terminal block according to claim 13, wherein the at least one driving hole comprises at least one inclined side wall; the at least one operating component is embedded in the at least one driving hole and is slidable along the at least one inclined side wall of the at least one driving hole.

17. The plug-in terminal block according to claim 16, wherein at least one first limit protrusion is arranged on a second side wall of the conductor cavity close to the at least one wire hole; the at least one first limit protrusion comprises a second limit inclined surface; the second limit inclined surface extends to the at least one inclined side wall of the at least one driving hole; the at least one operating component is slidable along the second limit inclined surface.

* * * * *